United States Patent [19]

Takahashi et al.

[11] 4,285,089
[45] Aug. 25, 1981

[54] WINDSHIELD WASHER OF MOTOR VEHICLE

[75] Inventors: Koichi Takahashi, Yokohama; Yoshiaki Kato, Fujisawa, both of Japan

[73] Assignee: Nissan Motor Company, Limited, Yokohama, Japan

[21] Appl. No.: 40,307

[22] Filed: May 18, 1979

[30] Foreign Application Priority Data

May 24, 1978 [JP] Japan ................................. 53-60921

[51] Int. Cl.³ ............................................. B60S 1/48
[52] U.S. Cl. ............................................. 15/250.02
[58] Field of Search .................... 15/250.02; 318/443, 318/DIG. 2

[56] References Cited

U.S. PATENT DOCUMENTS 3,703,017  11/1972  Edwards et al. .................. 15/250.02

FOREIGN PATENT DOCUMENTS 1555169  10/1970  Fed. Rep. of Germany ........ 15/250.02
1236398   6/1970  United Kingdom .................. 15/250.02

Primary Examiner—Edward L. Roberts

[57] ABSTRACT

The wipers of a windshield wiper are oscillated by a drive shaft driven by a wiper motor. A disc-type contact base member is securely mounted on the drive shaft to carry thereon two electrically conductive plates each of which is contactable with a pair of stationary contacts. When an electrical connection is established between the pair of stationary contacts, a washer pump supplied with electric current is driven to eject a washer liquid through nozzles onto the surface of a windshield. The conductive plates are so located that the electrical connection between the pair of stationary contacts is established only during time periods in which the wiper blades move in both "go" and "return" directions from their starting positions to positions which are immediately in front of the positions at which the wiper blades would be struck by the washer liquid being ejected from the nozzles.

11 Claims, 9 Drawing Figures

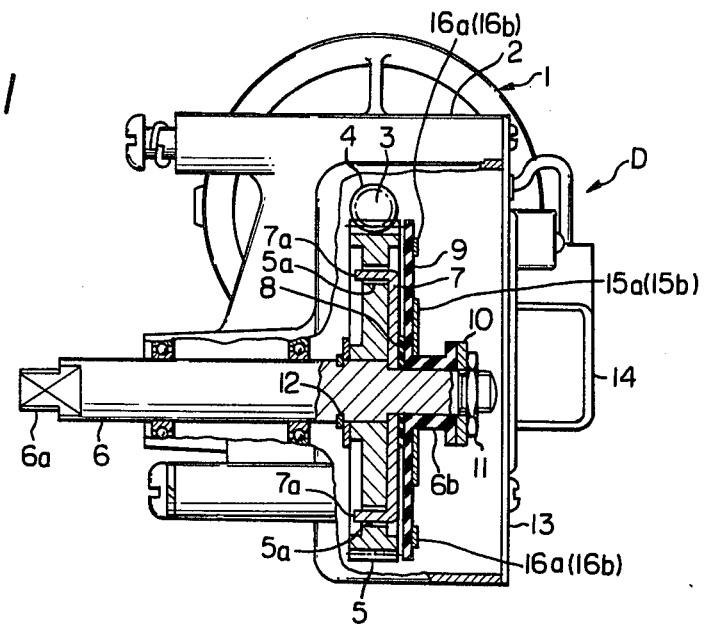
Fig. 1
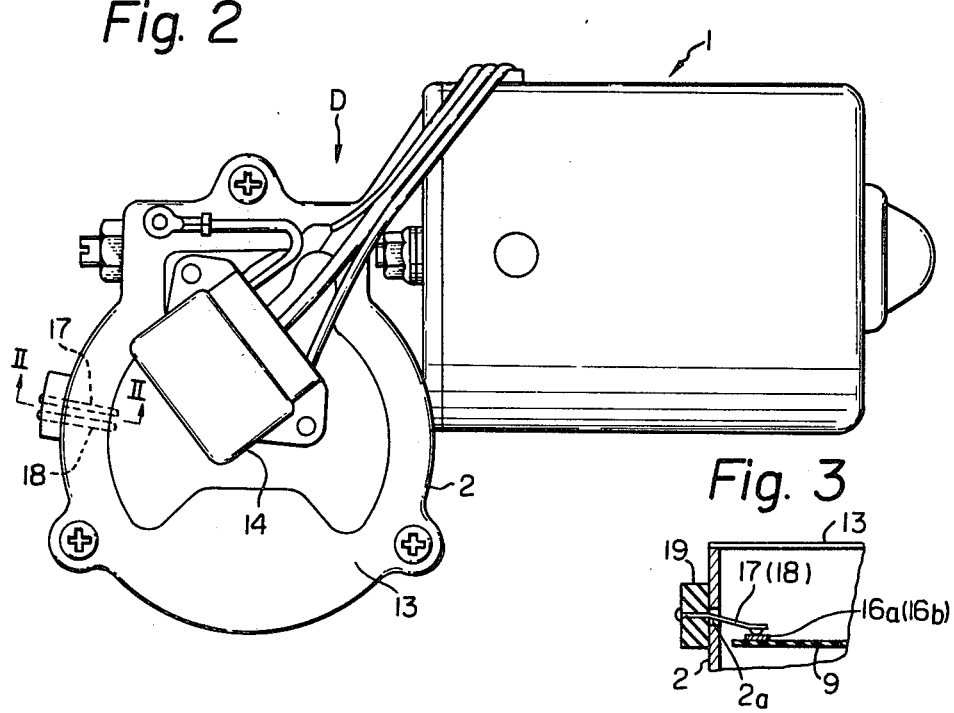
Fig. 2
Fig. 3

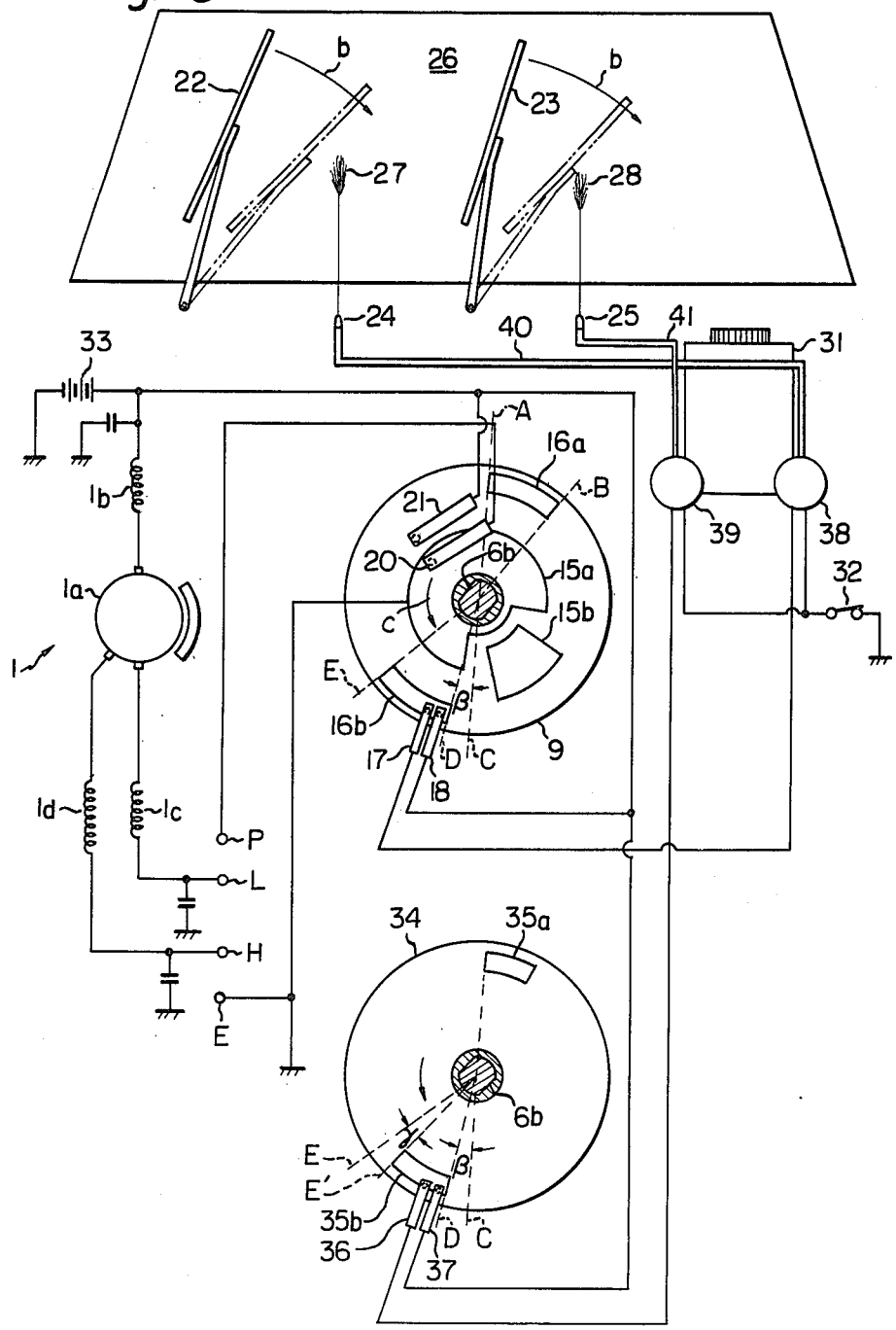

WINDSHIELD WASHER OF MOTOR VEHICLE

BACKGROUND OF THE INVENTION

The present invention relates to an improvement in a combination of a windshield wiper and a windshield washer for washing off dust, dirt, the dead bodies of worms etc. on the surface of a windshield of a motor vehicle, and more particularly to a device for controlling the duration of ejecting a washer liquid onto the surface of the windshield in relation to the moving positions of wiper blades of the windshield wiper.

Motor vehicles such as automotive vehicles are in general provided with windshield wipers having wiper blades to wipe off rain and snow on a front windshield to obtain a wide field of view for a driver of the vehicle. Additionally, the vehicles are further equipped with windshield washers which are operated in cooperation with the windshield wipers to wash down dust, dirt, the dead bodies of various worms etc. adhering to the windshield of the vehicle.

A conventional windshield washer is so constructed that a washer liquid is continuously ejected onto the surface of the windshield as long as the driver continues to push a switch to operate the washer. However, such a windshield washer encounters the problem that the washer liquid which is being ejected from a nozzle strikes even momentarily against the oscillating wiper blade and accordingly the washer liquid is dispersed onto the surface of the windshield. This considerably narrows the field of view of the driver until the wiper blade wipes off the dispersed washer liquid on the windshield. Besides, the continuous ejection of the washer liquid causes a further problem in that there is a time period in which the washer liquid is ejected rearwardly of the the wiper blade in the moving direction of the wiper blade. The thus ejected washer liquid does not serve to wash off the windshield and flows down on the windshield, wasting the washer liquid.

SUMMARY OF THE INVENTION

In view of the above, the present invention contemplates to solve the problems encountered in conventional windshield washers used in combination with windshield wipers by paying attention to the fact that it is not only unnecessary but also dangerous to eject washer liquid on the surface of a windshield of a motor vehicle throughout all "go" and "return" movements of the wiper blades of the windshield wiper.

It is an object of the present invention to provide a system including windshield washer and wiper, by which the field of view of the driver cannot be narrowed by washer liquid ejected onto a windshield from a nozzle, thus saving the washer liquid.

It is another object of the present invention to provide a system including windshield washer and wiper, by which the moving wiper blades of the wiper never strike against washer liquid which is being ejected from a nozzle onto a windshield, and additionally the washer liquid is never ejected rearwardly of the wiper blades in the moving direction of the wiper blades.

It is a further object of the present invention to provide a system including windshield washer and wiper, by which washer liquid is ejected onto the surface of a windshield during time periods in which the wiper blades move in both "go" and "return" directions from the starting positions to positions which are immediately in front of the interfering positions in which the wiper blades strike against the washer liquids which are being ejected from nozzles.

These and other objects, features and advantages of the system according to the present invention will be more apparent from the following description when taken in conjunction with the accompanying drawings.

BRIEF DESCRIPTION OF THE DRAWINGS

FIG. 1 is an illustration partly in section of an embodiment of an essential part of a system in accordance with the present invention;

FIG. 2 is an elevational view of the essential part of the system of FIG. 1;

FIG. 3 is a cross-sectional view taken in the direction of the arrows substantially along the line II—II of FIG. 2, showing a contact mechanism of the system of FIG. 1;

FIG. 9 is a grammatical representation similar to FIG. 8, but illustrating another stage in the operation of the system of FIG. 6.

DESCRIPTION OF THE PREFERRED EMBODIMENTS

Figure 4:
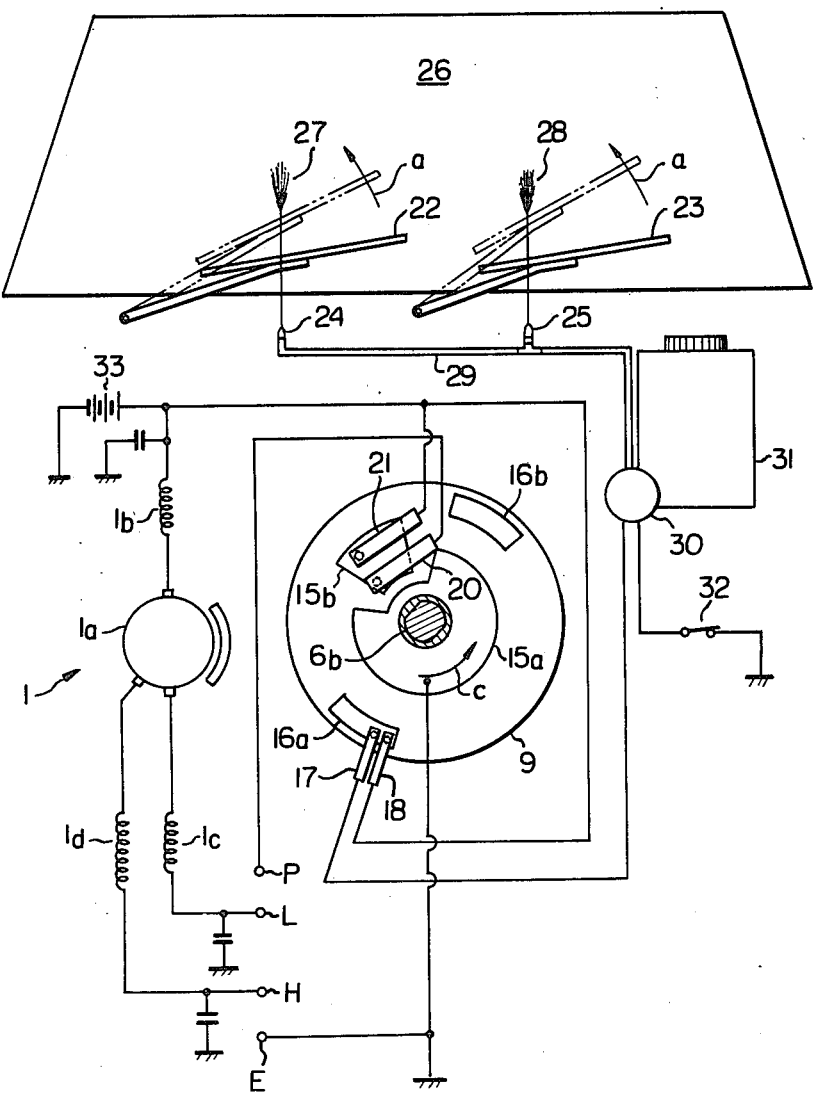
FIG. 4 is a diagrammatical representation of the system of FIG. 1, illustrating one stage in the operation of the system.

Referring now to FIGS. 1 to 5 of the drawings, there is shown an embodiment of a system in accordance with the present invention, which system includes windshield wiper and washer for a windshield of a motor vehicle such as an automotive vehicle. The wiper is composed of a wiper driving section D which includes a wiper motor 1 whose casing is integral with a gear box 2. The rotatable shaft 3 of the motor 1 projects into the gear box 2 and is provided at its end with a worm 4. The worm 4 meshes with a worm wheel or gear 5 which is securely mounted on a drive shaft 6 which is journalled by the gear box 2. One end portion 6a of the drive shaft 6 projects outside of the gear box 2 and is cut out to have a non-circular shape in cross-section to mount on the end portion 6a a member (not shown) which is operatively connected through a known mechanicsm (not shown) to wiper blades 22 and 23 (shown in FIGS. 4 and 5) so as to reciprocally oscillate the wiper blades. The other end portion 6b of the drive shaft 6 is also cut out to have a non-circular shape in cross-section.

A drive plate 7, a spacer 8, a contact base member 9 and a washer 10 are in contact with each other and mounted on the end portion 6b of the drive shaft 6. Elements 7, 8, 9 and 10 are urged and secured to the worm wheel 5 by the action of a nut screwed on the end portion 6b and a ring member 12 secured on the drive shaft 6. The drive plate 7 is formed with bent portions 7a which are disposed to pass through openings 5a of the worm wheel 5 so that the drive plate 7 is drivably connected to the worm wheel 5. It will be appreciated that all the elements indicated by the reference numerals 5 to 12 inclusive are enclosed in the gear box 2 which is closed by a bottom cover 13. The reference numeral 14 indicates an electrical connector to be used for an electrical connection in an electric circuit.

The contact base member 9 is formed with a disc portion having a flat surface which faces away from the worm wheel 5, on which surface electrically conductive plates or movable contacts 15a, 15b and 16a, 16b are securely mounted. Stationary contacts 17 and 18 are located so as to be contactable by the conductive plates 16a, 16b of arcuate shape as clearly shown in FIG. 3, and securely supported by a rubber member 19 on the outer surface of the gear box 2. The contacts 17 and 18 project into the interior of gear box 2 passing through openings 2a formed through the wall of the gear box 2, and are urged to contact the conductive plates 16a and 16b due to the elasticity of the contacts 17 and 18 themselves.

As viewed in FIG. 4, the conductive plates 16a and 16b are located on the same circumference or circle concentrical with the drive shaft 6, which circumference is in close proximity to the peripheral surface of the contact base member 9. The conductive plate 16a is so arranged and formed that an electrical connection is established between the contacts 17 and 18 during a time period in which the wiper blades 22 and 23 are moved in a first "go" direction (indicated by arrows a in FIG. 4) from first positions (indicated by solid lines) for starting the "go" movement toward third positions (indicated in phantom) which lie immediately in front of the positions at which the wiper blades are in the path of the sprays of washing liquid 27 and 28 which are ejected from nozzles 24 and 25 on the surface of the windshield 26 as shown in FIG. 4. The conductive plate 16b is so arranged and formed that an electrical connection is established between the contacts 17 and 18 during a time period in which the wiper blades 22 and 23 are moved in a second "return" direction (indicated by arrows b in FIG. 5) from second positions (indicated by solid lines) for starting the "return" movement toward fourth positions (indicated in phantom) which lie immediately in front of the positions at which the wiper blades strike the sprays of washing liquid 27 and 28 which are ejected from the nozzles 24 and 25 as shown in FIG. 5.

The nozzles 24 and 25 are connected through a common pipe 29 to the discharge port of a washer pump 30 whose inlet port opens into the inside of a washing liquid tank 31. The pump 30 is of the electrically operated type and, one terminal of the pump 30 is grounded through a switch 32. The other terminal of the pump 30 is electrically connected to the contact 17. The contact 18 is electrically connected to the positive terminal of a battery 33 whose negative terminal is grounded.

Figure 5:
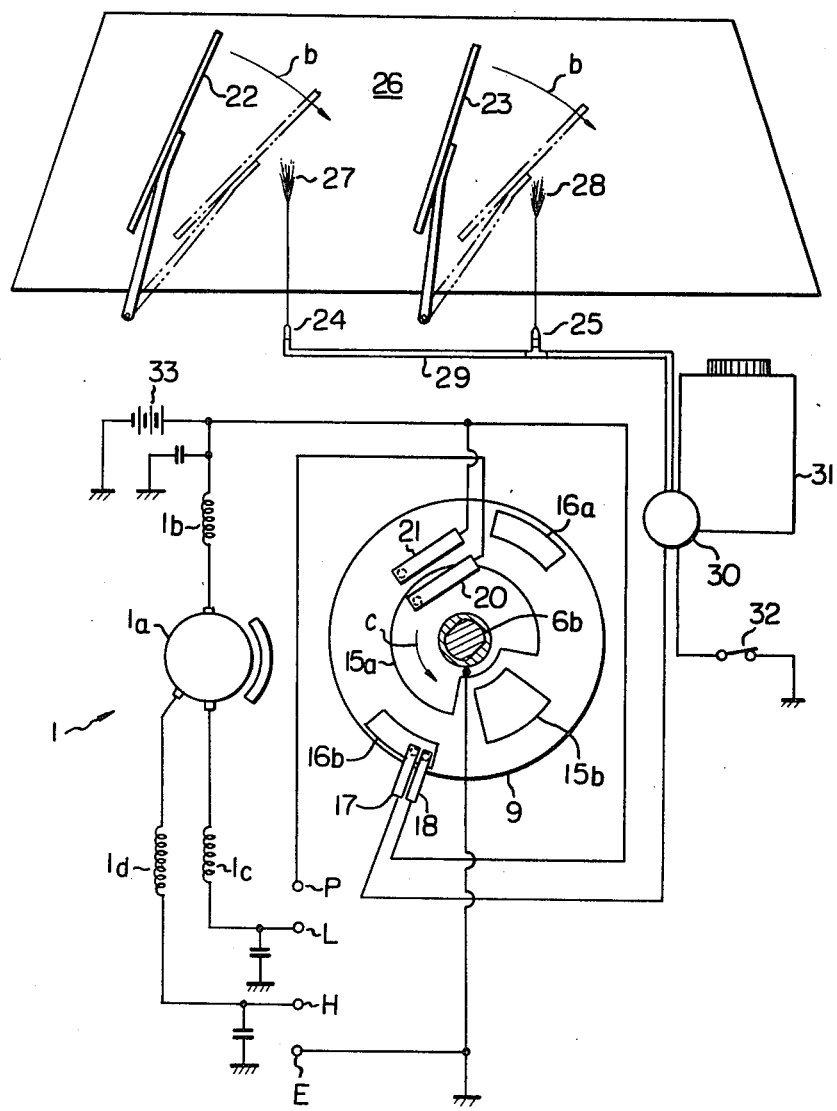
FIG. 5 is a diagrammatical representation similar to FIG. 4; but showing another stage in the operation of the system of FIG. 1.

As shown in FIGS. 4 and 5, the wiper motor 1 includes an armature 1a which is electrically connectable to three field coils 1b, 1c and 1d. The field coil 1b is electrically connected to the battery 33. The field coil 1c is electrically connected to a contact point L of a wiper switch (not identified) which is operated by a driver of the vehicle. The field coil 1d which is larger in the number of windings than the field coil 1c is electrically connected to a contact point H of the wiper switch. A contact point P of the wiper switch is electrically connected to the stationary contact 20. The stationary contact 21 is electrically connected to the positive terminal of the battery 33. A contact point E of the wiper switch is grounded as well as the conductive plate 15a.

The operation of the thus arranged system is as follows:

At first, the operation of the windshield wiper will be explained. When the wiper switch is put into a position for operating the wiper at a low speed, an electric connection is established between the contact points L and E and the electric current from the battery 33 flows through the field coil 1b, the armature 1a, the field coil 1c and the conatct points L and E. As a result, the armature 1a rotates at a low speed which depends upon the relationship between the numbers of windings of the field coils 1b and 1c. The wiper motor 1 thus operated at a low speed causes the rotation of the drive shaft 6 via the rotatable shaft 3, the worm 4, the worm gear 5 and the drive plate 7. Consequently, the wiper blades 22 and 23 are reciprocally oscillated at a low speed through the member secured to the end 6a of the drive shaft 6. It will be understood that the contact base member 9 secured to the end 6b of the drive shaft 6 is rotated in the direction of the arrow C indicated in FIGS. 4 and 5. The "go" and "return" movements of the wiper blades 22 and 23 are accomplished by one turn of the contact base member 9.

When the wiper switch is put into the position for operating the wiper at a high speed, an electric connection is established between the contact points H and E and accordingly the electric current from the battery 33 flows through the field coil 1b, the armature 1a, and the field coil 1d. Thus, the armature 1a rotates at a high speed since the number of windings of the field coil 1d is larger than that of the field coil 1c. As a result, the wiper motor 1 causes to reciprocally oscillate the wiper blades 22 and 23 at a high speed.

When the wiper switch is put into the "OFF" position, an electric connection is established between the contact points P and L so that the contact 20 is electrically connected to the positive terminal of the battery 33 through the contact points P and L, the field coil 1c, the armature 1a and the field coil 1b. At this moment, the voltages of the contacts 20 and 21 are at the same level since the contact 21 is electrically connected to the positive terminal of the battery 33. Accordingly, the motor 1 stops the instant the contacts 20 and 21 are put on the conductive plate 15b to establish an electric connection between the contacts 20 and 21 through this conductive plate 15a, i.e., at a rotational position of the contact base member 9 for putting the wiper blades 22 and 23 at positions where the wiper blades 22 and 23 complete the "return" movement and initiate the "go" movement. However, when the contact base member 9 is at the rotational positions where the wiper blades 22 and 23 are put into positions other than the above-mentioned positions, the stationary contact 20 contacts the conductive plate 15a. Accordingly, due to the fact that the conductive plate 15a is grounded, if the wiper switch is put into the "OFF" position as mentioned above, electric current from the battery 33 flows through the field coil 1b, the armature 1a, the field coil 1c, contact points L and P, the stationary contact 20 and the conductive plate 15a so that the motor 1 continues to rotate at a low speed. The motor 1 stops for the first time when the wiper blades 22 and 23 are put into positions for completing the "return" movement and initiating the "go" movement, and accordingly the wiper blades 22 and 23 stop at the above-mentioned preset positions.

During the "go" and "return" movements of the wiper blades 22 and 23, i.e., the contact base member rotates in the direction of the arrows C in FIGS. 4 and 5, when the driver of the vehicle operates to close the washer switch 32, the windshield washer is constructed and arranged to eject intermittently the washer liquid from the nozzles 24 and 25 onto the surface of the windshield 26 as will be discussed in detail hereinafter.

When the contacts 17 and 18 contact the conductive plate 16a, i.e., the wiper blades 22 and 23 move from the positions (indicated by the solid lines) to the positions (indicated in phantom) immediately in front of the positions at which the wiper blades intersect the jets of washer liquid being ejected as shown in FIG. 4, electric current from the battery 33 flows through the contact 18, the conductive plate 16a, the contact 17, the washer pump 30 and the switch 32 so as to operate the washer pump 30 to eject the washer liquid through the nozzles 24 and 25 onto the surface of the windshield 26. However, when the wiper blades 22 and 23 move in the "go" direction beyond the positions indicated in phantom in FIG. 4, i.e., when the contact base member rotates from a position at which the contacts 17 and 18 disengage from the conductive plate 16a to a position at which the conductive plate 16b contacts the contacts 17 and 18 as shown in FIG. 5, the contacts 17 and 18 contact the surface of the base member 9 which surface is made of an electric insulating material and accordingly the electric connection between the contacts 17 and 18 is blocked. Then, the current flow to the washer pump 30 is blocked so that the washer liquid is not ejected from the nozzles 24 and 25. After the ejection of the washer liquid is stopped, the wiper blades 22 and 23 carry the already ejected washer liquid, wiping off the surface of the windshield 26, by which the windshield 26 is prevented from being damaged. When the contact base member 9 rotates by an angle of 180 degrees from the position indicated in FIG. 4 to the position indicated in FIG. 5, the wiper blades 22 and 23 complete the "go" movement and are put into the positions for initiating the "return" movement as indicated by solid lines in FIG. 5. Then, the conductive plate 16b contacts the contacts 17 and 18 to establish the electrical connection between the contacts 17 and 18, which electrical connection continues until the wiper blades 22 and 23 move in the "return" direction from the positions (indicated by solid lines in FIG. 5) to the positions (indicated in phantom in FIG. 5) immediately in front of the position at which the wiper blades 22, 23 intersect with the jets of washer liquid being ejected from the nozzles 24, 25. When the wiper blades 22 and 23 further continue to move in the "return" direction beyond the above-mentioned positions, the contacts 17 and 18 disengage from the conductive plate 16b to block the electric connection between the contacts 17 and 18. Accordingly, the washer pump 30 can eject the washer liquid through the nozzles 24 and 25 while the wiper blades 22 and 23 move in the "return" direction from the position indicated by the solid lines to the positions indicated in phantom as shown in FIG. 5, causing the current flow to the washer pump 30 by the establishment of the electrical connection between the contacts 17 and 18.

Over the rotating range of the contact base member 9 from the position at which the conductive plate 16b disengages from the contacts 17 and 18 to the position at which the conductive plate 16a is in contact with the contacts 17 and 18, i.e., while the wiper blades 22 and 23 move in the "return" direction from the positions indicated in phantom in FIG. 5 to the positions indicated by the solid lines in FIG. 4, the contacts 17 and 18 contact the insulating surface of the contact base member 9 to block the electric connection between the contacts 17 and 18. Hence, over this rotating range, the washer pump 30 is not operated and consequently the washer liquid cannot be ejected from the nozzles 24 and 25. Also in case of the "return" movement of the wiper blades 22 and 23, after the ejection of the washer liquid is stopped, the wiper blades 22 and 23 effectively carry the already ejected washer liquid, wiping off the surface of the windshield 26 and therefore the windshield 26 is prevented from being damaged.

By the repetition of the above-mentioned operations, the washer liquid can be ejected intermittently onto the surface of the windshield 26 only during the time period in which the wiper blades 22 and 23 move from the positions for initiating the "go" and "return" movements to the positions immediately in front of the positions at which the wiper blades intersect with the washer liquid which is being ejected from the nozzles 24 and 25. This will avoid the drawbacks that the field of view of the driver is narrowed by the dispersion of the washer liquid due to the wiper blades within the washer liquid which is being ejected from the nozzles 24 and 25. Besides, the washer liquid is never ejected rearwardly of the wiper blades in the moving direction of the wiper blades and therefore the washer liquid is effectively used, saving it.

FIGS. 6 to 9 illustrate another embodiment of the system in accordance with the present invention which is substantially similar to the embodiment shown in FIGS. 1 to 5 and accordingly like reference numerals are assigned to like parts and elements. This embodiment is constructed and arranged so as to be suitable for the case in which the wiper blades 22 and 23 are different from each other in wiping range or area. In this instance, the wiping range of the wiper blade 22 is smaller than that of the blade 23.

Figure 6:
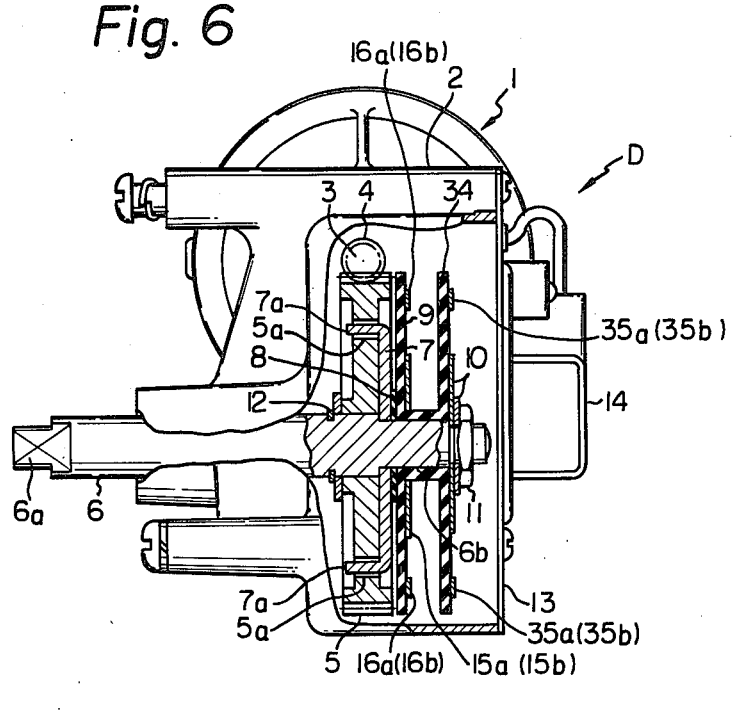
FIG. 6 is an illustration partly in section of an essential part of another embodiment of the system in accordance with the present invention.
Figure 7:
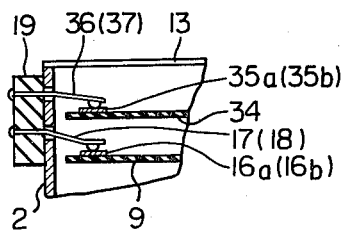
FIG. 7 is a cross-sectional view similar to FIG. 3, but showing the contact mechanism of the system of FIG. 6.

In this embodiment, as shown in FIGS. 6 and 7, another contact base member 34 is provided parallelly and integrally with the contact base member 9. Two arcuate conductive plates 35a and 35b are secured on the surface of the contact base member 34. Two contacts 36 and 37 are provided to be contactable with the conductive plates 35a and 35b as clearly shown in FIG. 7. It is to be noted that the conductive plates 35a and 35b are located on the same circumference or circle concentrical with the drive shaft 6 as shown in FIG. 8.

Figure 8:
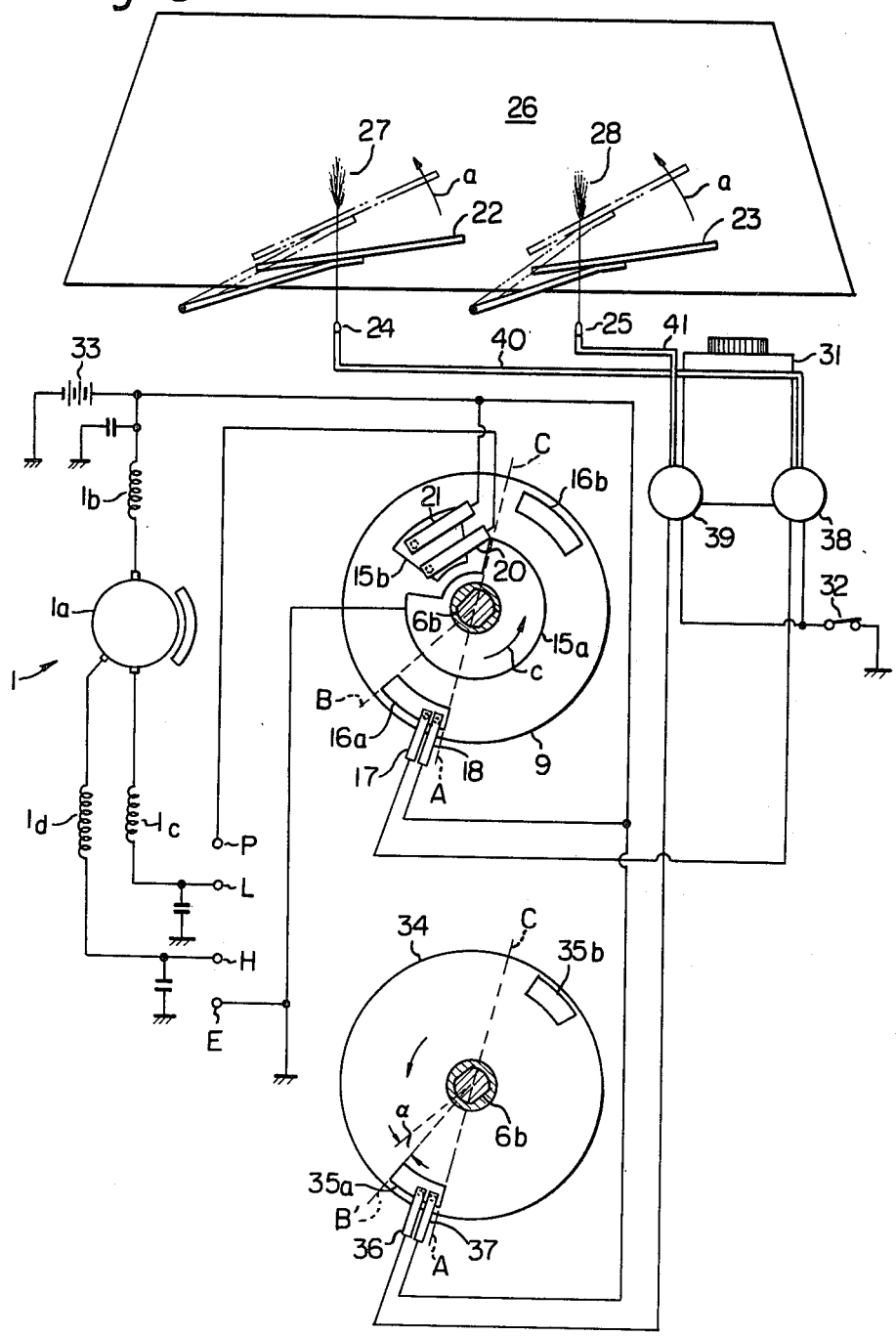
FIG. 8 is a diagrammatical representation of the system of FIG. 6, illustrating one stage in the operation of the system.

In this instance, as viewed in FIG. 8, each of two washer pumps 38 and 39 is provided with the suction port open to the washer liquid tank 31. The discharge ports of the washer pumps 38 and 39 are fluidly connected through pipes 40 and 41 to the nozzles 24 and 25, respectively. One terminal of each washer pump 38 or 39 is electrically connected to the common washer switch 32. Another terminal of each washer pump 38 or 39 is electrically connected to the contact 17 or 36, respectively. The contacts 18 and 37 are both electrically connected to the positive terminal of the battery 33. In this case, the conductive plate 16a is so arranged and formed that the electrical connection is established between the contacts 17 and 18 during a time period in which the wiper blade 22 is moved in the first "go" direction from a first position (indicated by solid lines in FIG. 8) for starting the "go" movement to a third position (indicated in phantom in FIG. 8) which lies immediately in front of a position in which the wiper blade is hit by wiper liquid 27 which is being ejected from the nozzle 24. The conductive plate 35a is so arranged and formed that the electrical connection is established between the contacts 36 and 37 during a time period in which the wiper blade 23 is moved in the first "go" direction from a first position (indicated by solid lines in FIG. 8) for starting the "go" movement to a third position (indicated in phantom in FIG. 8) which lies immediately in front of a position in which the wiper blade 23 is hit by wiper liquid 28 which is being ejected from the nozzle 25. In the case in which the washer liquids are ejected on the same level surface of the windshield 26 from the nozzles 24 and 25 to prevent the field of view from being narrowed, the conductive plate 35a is formed smaller in length than the conductive plate 16a. Additionally, the conductive plates 35a and 16a are so formed that the electrical connection is blocked between the contacts 17 and 18 at a rotational position B' of the contact base member 34 which position is earlier than a rotational position B of the contact base member 9 by $\alpha$ in rotational angle or the angle at the circumference of the contact base member 34. These are necessary because the wiping range allotted to the wiper blade 23 is wider than that of the wiper blade 22 and accordingly the moving speed of the former is higher than that of the latter. Further, the conductive plates 16a and 35a are so formed that the electrical connections begin to be established at the same rotational position A shown in FIG. 8 between the contacts 17 and 18 and the contacts 36 and 37. The conductive plates 16b and 35b are so formed that the electrical connections are established between the contacts 17 and 18 and between the contacts 36 and 37 during time periods in which the wiper blades 22 and 23 move in the second "return" direction from second positions indicated by solid lines in FIG. 9 (which positions correspond to the rotational positions D of the contact base members and are slightly moved in the "go" direction from the "return" movement starting positions corresponding to the rotational positions C of the contact base members) to fourth positions indicated in phantom, which positions lie immediately in front of the positions at which the wiper blades 22 and 23 are hit by the jets of washer liquids 27 and 28 which are being ejected from the nozzles 24 and 25, respectively. Thus, the electrical connections between the contacts 17 and 18 and between the contacts 36 and 37 begin to be established at the position (corresponding to the rotational position D) which is moved in the "return" direction by a rotational angle $\beta$ of the contact base member from the "return" movement starting positions (corresponding to the rotational positions C of the contact base members). Such an operation contributes to saving washer liquid, because if the electrical connection begins to be established when the wiper blades 22 and 23 begin to move in the "go" direction, too much time is spent until the wiper blades 22 and 23 reach the washer liquid on the surface of the windshield 26 and accordingly the washer liquid is wasted.

Since the moving speed of the wiper blade 23 is higher than that of the wiper blade 22, the conductive plate 35b is made shorter than the conductive plate 16b so that the electrical connection between the contacts 36 and 37 is blocked at a rotational position E' which is earlier by a rotational angle $\gamma$ of the contact base member than the rotational position E at which the electric connection is established between the contacts 17 and 18.

In order to avoid a shortage of the washer liquid 28 ejected from the nozzle 25 due to the fact that the washer liquid 28 is smaller in ejected amount than the washer liquid 27, the conductive plate 35b may be, for example, extended toward the rotational position C beyond the rotational position D on the surface of the contact base member 34.

With the thus arranged system shown in FIGS. 6 to 9, during the oscillation of the wiper blades 22 and 23, i.e., the rotation of the contact base members 9 and 34 in the direction of the arrow C shown in FIGS. 8 and 9, when the washer switch 32 is closed, the electrical connections are intermittently established between the contacts 17 and 18 and the contacts 36 and 37 and accordingly the washer liquids 27 and 28 are ejected from the nozzles 24 and 25, respectively. The electrical connections between the contacts 17 and 18 and between the contacts 36 and 37 are determined to be established within the above-mentioned particular ranges of the oscillation of the wiper blades 22 and 23. Therefore, the time periods for ejecting the washer liquids 27 and 28 can be maintained at an optimum even if the wiping ranges of the two wiper blades 22 and 23 are different from each other. It will be understood that the system shown in FIGS. 6 to 9 also has substantially the same advantages as the system shown in FIGS. 1 to 5.

While the two contact base members 9 and 34 have been used in the system shown in FIGS. 6 to 9, it will be appreciated that only one contact base member may be used in which case the conductive plates 16a and 16b could be formed on one side surface and the conductive plates 35a and 35b on the other side surface.

What is claimed is:

1. A system for use in a motor vehicle having a windshield, comprising:
    a first windshield wiper having a first wiper blade mounted for oscillation between first and second end positions in first and second opposite directions;
    a first windshield washer having a first nozzle which is fluidly connected to an electrically operated first washer pump for ejecting washer liquid through the first nozzle when supplied with electric current;
    a first contact base member rotatable in accordance with the oscillation movement of said wiper blade;
    a first stationary contact electrically connected to said first washer pump;
    first and second movable contacts formed on said first contact base member, each of said movable contacts being contactable with said first stationary contact to supply electric current to said first washer pump through said first stationary contact;
    said first movable contact being formed to be contactable with said stationary contact within a first range in which said wiper blade moves in the first direction from the first position to a third position which is immediately in front of the position in which said first wiper blade is in the path of washer liquid being ejected from said first nozzle, and said second movable contact being formed to be contactable with said stationary contact within a second range in which said wiper blade moves in the second direction from the second position to a fourth position which is immediately in front of the position in which said first washer blade is in the path of the washer liquid being ejected from said nozzle;

a second windshield wiper having a second wiper blade mounted for oscillation between first and second positions in first and second opposite directions, said second wiper blade being different from said first wiper blade in wiping range over the windshield and moving speed;

a second windshield washer having a second nozzle which is fluidly connected to an electrically operated second washer pump for ejecting washer liquid through a second nozzle when supplied with electric current;

a second contact base member rotatable with said first contact base member;

a second stationary contact electrically connected to said second washer pump;

third and fourth movable contacts formed on said second contact base member, each of said third and fourth movable contacts being contactable with said second stationary contact to supply electric current to said second washer pump through said stationary contact, said third movable contact being different in size from said first stationary contact, said fourth movable contact being different in size from said second movable contact;

said third movable contact being formed to be contactable with said second stationary contact within a third range in which said second wiper blade moves in the first direction from the first position to a third position which is immediately in front of the position in which said second wiper blade is in the path of washer liquid being ejected from said second nozzle, and said fourth movable contact being formed to be contactable with said second stationary contact within a fourth range in which said second wiper blade moves in the second direction from the second position to a fourth position which is immediately in front of the position in which said second washer blade is in the path of washer liquid being ejected from said second nozzle.

2. A system as claimed in claim 1, in which said first stationary contact includes two stationary contacts which are separate from each other, the electrical connection being established between said two stationary contacts upon contact with each of said first and second movable contacts, said two stationary contacts being electrically connected to said washer pump and an electric source, respectively.

3. A system as claimed in claim 1, further comprising a washer switch which is closable to supply the washer pump with the electric current.

4. A system as claimed in claim 3, in which said first contact base member is mounted on a drive shaft mechanically connected to said first wiper blade so as to oscillate said first wiper blade, said first base member being formed with a disc portion concentrical with said drive shaft.

5. A system as claimed in claim 4, in which said first and second movable contacts are first and second arcuate conductive plates which are secured on the surface of said disc portion of said first contact base member.

6. A system as claimed in claim 5, in which said first and second arcuate conductive plates are located on the same circumference concentrical with said drive shaft.

7. A system as claimed in claim 5, in which said second stationary contact includes two stationary contacts which are separate from each other, the electrical connection being established between said two stationary contacts upon contact with each of said third and fourth movable contacts, said two stationary contacts being electrically connected to said second washer pump and said electric source, respectively, said second washer pump being electrically connected to said washer switch.

8. A system as claimed in claim 1, in which said second contact base member is mounted on a drive shaft in parallel with said first contact base member, said second wiper blade being mechanically connected to said drive shaft, said second contact base member being formed with a disc portion concentrical with said drive shaft.

9. A system as claimed in claim 8, in which said third and fourth movable contacts are third and fourth arcuate conductive plates secured on the surface of said disc portion of said second contact base member.

10. A system as claimed in claim 9, in which said third and fourth arcuate conductive plates are located on the same circumference concentrical with said drive shaft.

11. A system as claimed in claim 10, in which said third and fourth arcuate conductive plates are smaller in length than said first and second conductive plates, respectively.

* * * * *